United States Patent [19]

Russ et al.

[11] Patent Number: 4,564,207
[45] Date of Patent: Jan. 14, 1986

[54] HYDRAULIC WHEEL LIFT SYSTEM FOR TOW VEHICLES

[76] Inventors: Calvin W. Russ, 2119 E. Indian River Rd., Norfolk, Va. 23523; David A. Craze, 1309 Ormer Rd., Chesapeake, Va. 23325

[21] Appl. No.: 542,666

[22] Filed: Oct. 17, 1983

[51] Int. Cl.[4] .............................................. B60P 3/12
[52] U.S. Cl. ..................................... 280/402; 414/429; 414/563
[58] Field of Search ................. 280/402; 414/429, 563

[56] References Cited

U.S. PATENT DOCUMENTS

| | | | |
|---|---|---|---|
| 3,877,591 | 4/1975 | Howard | 414/563 |
| 4,034,873 | 7/1977 | Haring | 280/402 |
| 4,186,938 | 2/1980 | Youngblood | 280/402 |
| 4,384,817 | 5/1983 | Peterson | 414/563 |
| 4,473,237 | 9/1984 | Lind | 280/402 |
| 4,473,334 | 9/1984 | Brown | 280/402 |

FOREIGN PATENT DOCUMENTS 2608523  9/1977  Fed. Rep. of Germany ...... 414/563

OTHER PUBLICATIONS

Peterson scoop advertisement
Century Formula I advertisement.
Ernest Holmes advertisement.
Vulcan Cradle Snatcher II advertisement.

*Primary Examiner*—John A. Pekar
*Assistant Examiner*—Everett G. Diederiks, Jr.
*Attorney, Agent, or Firm*—Sandler & Greenblum

[57] ABSTRACT

A hydraulic wheel lift device is adapted to be used with tow vehicles. The device is attached to a tow truck by means of a main boom pivotally secured to a wheel boom, which abuts against the tread portions of tires that the device will lift. A pair of L-shaped arms pivotally secured to the wheel boom are actuated to swing so that they frame the underside of the tires. As a result, each tire is framed by a U-shaped bracket consisting of the wheel boom and the L-shaped arms. The main boom is lifted and in turn lifts the tires and the vehicle being towed.

17 Claims, 3 Drawing Figures

HYDRAULIC WHEEL LIFT SYSTEM FOR TOW VEHICLES

BACKGROUND OF THE INVENTION

1. Field of the Invention

The present invention relates generally to a wheel lift attachment for a towing vehicle, and more specifically to a hydraulic wheel lift device suitable for use on a wrecker truck and other tow vehicles.

2. Discussion of the Prior Art

The lack of traditional full transverse axles in new foreign and American cars has rendered once commonplace axle tow connections difficult and dangerous for these cars. Also, recent changes in bumper design, including shielded bumper constructions and shock-resistant bumper mountings, have eliminated the traditional bumper-tow connection points and provided materials that are damaged by the pulling of a tow hook or chain. As a result, recent vehicle lift designs have been developed that are oriented to engage the underside of a vehicle frame, or the front or rear wheels of a vehicle. These designs avoid potential frame and bumper damage resulting from the traditional towing connections.

Tow connections in accordance with the recent designs, however, require precise alignment of the tow truck with the vehicle to be towed. On an empty street with a sufficient amount of maneuvering room, proper alignment is a relatively easy task. In crowded lots and along curbsides, where heavy traffic restricts movement, the new designs prove to be cumbersome and fail to give the tow operator the same flexibility that the chain and hook-type systems provided. Further, the more recent designs are not adapted to provide fully automatic connections, thus forcing the driver to leave the cab to hook and unhook the vehicle to be towed.

PETERSON, U.S. Pat. No. 3,484,817, for example, discloses a vehicle lift for a wrecker truck which employs manually deployable fork elements. In operation, a lift-boom attached to the tow truck, is lowered and a pair of folded wheel forks are manually unfolded by the operator. Support rods, located at the distal ends of the forks, are then manually removed from the forks, and the tow truck backs the lift forks toward the vehicle to be towed until the forks surround the wheels. In this position, the support rods are replaced, forming rectangular frames whose longitudinal sides are shorter than the diameter of the tire. The forks and vehicle are then raised by the lift-boom, and the vehicle is towed away. The forks, however, must be precisely aligned with the tire, requiring the operator to back up the forks within about a half-foot from the center line of the tires. Further, the tow operation requires at least three manual steps: two before the wheels are engaged and one after the wheel has been engaged.

HARING, U.S. Pat. No. 4,034,873, discloses a towing sling which can be placed under a tire without the need to raise the vehicle. This is accomplished by abutting a pair of slant bars next to the tires and by then securing the bars to the tires by a pair of adjustable bars. As a result, a cradle is formed about the tires, and is then attached to a conventional tow truck cable which includes a stabilizer to properly maintain the vehicle in a horizontal plane when being raised. While HARING discloses a frame which can be more easily negotiated in tight spaces, the apparatus requires manual assembly underneath the vehicle. Therefore, the operation is both time-consuming and may require more than one operator.

Finally, YOUNG BLOOD, U.S. Pat. No. 4,186,938, discloses a tow lift arrangement which requires attachment of a tow bar directly to the frame of the vehicle. The tow bar must be manually attached to the vehicle and requires precise alignment with the vehicle frame in order to place the ends of the tow bar in direct communication with holes in the frame. YOUNG BLOOD, as a result, also requires precise alignment and would need two operators to achieve alignment. Also, YOUNG BLOOD does not benefit from attaching a connection to a point where the suspension system of the vehicle can be used as a shock absorber.

In conclusion, prior art vehicle wheel lift devices require complex or difficult maneuvers of the tow truck to correctly align the vehicle lift system, or entail manual manipulation to securely connect the apparatus to the vehicle. Both of these problems are clearly overcome by the present invention.

SUMMARY OF THE INVENTION

Accordingly, it is an object of the present invention to overcome the deficiencies of the prior art by providing a hydraulic wheel lift device which can be easily aligned with a vehicle to be towed without requiring the services of more than one operator.

It is another object of the present invention to provide a hydraulic wheel lift device which is fully automated and which can be deployed while the tow vehicle operator remains in the truck.

It is another object of the present invention to provide a hydraulic wheel lift apparatus which has a simple yet sturdy construction.

It is a further object of this invention to provide a hydraulic wheel lift device which engages the underside of vehicle tires, thus avoiding vehicle frame or bumper damage resulting from traditional tow arrangements.

In a first aspect thereof, the present invention comprises a device adapted to be attached to a towing vehicle and adapted to raise the wheels of a vehicle to be towed. The device comprises at least one main boom adapted to be mounted on the towing vehicle, a wheel boom connected to the main boom in a position substantially transverse to the main boom, and a pair of tire lift arms, each of which is substantially L-shaped and each of which is pivotably attached to the wheel boom. The device also includes means for pivoting the lift arms between a rest position adjacent to the wheel boom and an operative position in which each lift arm forms a substantially U-shaped frame with a portion of the wheel boom. The U-shaped frame comprises means for engaging and supporting the underside of a respective vehicle tire.

The lift arms are attached to each wheel boom on opposite sides of the intersection between the wheel boom and the main boom. The device further comprises means for moving the main boom in both horizontal and vertical planes. The wheel boom is pivotably connected to the main boom and is pivotable about ninety degrees in one direction and over about 55° in the opposite direction, taken along a horizontal plane. The wheel boom and the main boom are connected by a flange having an arcuate end attached to a central point of the wheel boom. The flange has a flange aperture which is located adjacent to an opposite end of the flange. The flange aperture is aligned with an aperture in the main boom, a first pin adapted to be inserted through said flange aperture and into said main boom aperture to thus pivotably connect the wheel boom to the main boom. Each of the first arms comprises an integral, arcuately shaped base portion and an L-shaped arm portion having upper and lower segments. Each base portion has a first aperture and a second aperture, with the second aperture being located adjacent to the lower segment of the L-shaped arm.

Each of the second apertures is aligned with a respective wheel boom aperture, a second pin adapted to be inserted through said second aperture into said wheel boom aperture. The lift arms thus are adapted to pivot about the second aperture.

The lift arm pivoting means comprises a pair of hydraulically operated cylinders, each of the cylinders in turn comprising a cylinder portion and an arm portion which is adapted to reciprocate along a linear path parallel to the longitudinal axis of the wheel boom. The linear paths of the cylinders are directed oppositely from each other.

The hydraulic cylinders are attached to the wheel boom on opposite sides of the connection between the wheel and main booms, each cylinder being oriented parallel to the longitudinal axis of the wheel boom. The hydraulic cylinder arm portions move in a direction parallel to the wheel boom, inward movement of the arm portions pivoting the lift arms away from the wheel boom such that the lower segments of the L-shaped arms are spaced from the wheel boom in a position substantially parallel to the main boom. Each U-shaped frame comprises an end portion of the wheel boom, an upper segment of the L-shaped arm, and a lower segment of the L-shaped arm. The end portion and the upper segment are parallel and spaced apart by a distance less than the diameter of the vehicle tire to be lifted. The device can be used in combination with a towing vehicle, the main boom being attached to a rear portion of the vehicle.

In a second aspect of the present invention, a method for towing an automobile is provided. The method includes lowering a main boom attached to a tow vehicle and backing up the tow vehicle until the main boom is located substantially at the mid-point between tires on the vehicle so that a wheel boom which is transversely attached to the main boom will abut the thread portion of the tires. The method further comprises hydraulically actuating a pair of cylinders which are attached to the wheel boom such that a pair of L-shaped arms attached to the cylinders will pivot away from the wheel boom to form an open ended, U-shaped bracket to frame the underside of the vehicle tires. The main boom is then lifted to raise the vehicle tires off of the ground and the vehicle is then moved to an unloading destination.

BRIEF DESCRIPTION OF THE DRAWINGS

The above and other objects and advantages of this invention will be made more apparent when considering the following detailed description, appended claims and accompanying drawings, in which:

DETAILED DESCRIPTION OF THE INVENTION

Figure 1:
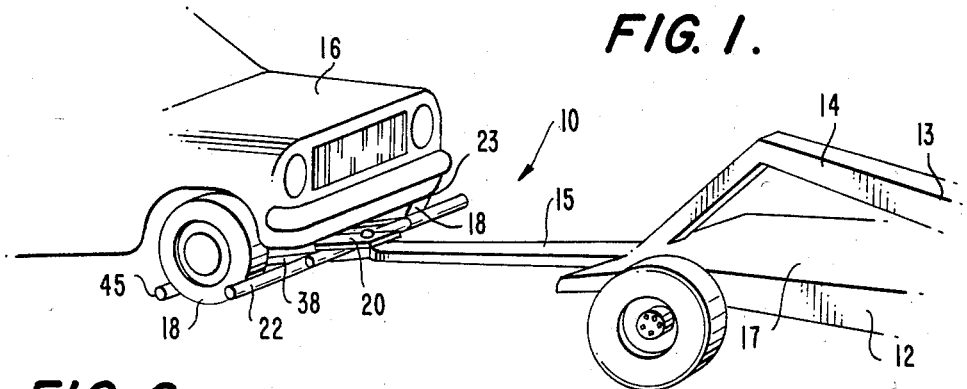
FIG. 1 is a perspective view of the wheel lift system of the present invention in operation.

Referring specifically to the drawings, wherein like reference numerals refer to like parts throughout the several drawings, FIG. 1 is a perspective view of wheel lift system 10 attached to tow truck 12 by main boom 14, which is powered by derrick 13 (not fully illustrated). Main boom 14 is illustrated as a single boom, but could equally well be any other conventional arrangement, e.g., a double boom arrangement of two parallel-positioned booms. Derrick 13 drives main boom 14 vertically and/or horizontally in conventional fashion, thereby reducing the difficulty encountered in more conventional arrangements in aligning wheel boom 22 with front tires 18 of vehicle 16 to be towed. Main boom 14 can have an angled or other conventional configuration. The illustrated shape is particularly adapted for lowering boom 14 below flat bed 17 of towing vehicle 12. Boom 14 can thereby be placed relatively close to the ground, allowing substantial clearance above wheel boom 22 and frame bottom 23 of vehicle 16. The wheel boom is positioned transversely with respect to main boom 14, as discussed in greater detail hereinafter.

In order to properly align wheel boom 22 with front vehicles tires 18, main boom 14 is moved rearwardly towards vehicle 16 until wheel boom 22 abuts front tires 18. Ideally, the longitudinal axis of main boom 14 should be located substantially at the midpoint between tires 18. Once properly in place, L-shaped arm portions 45 are swung into a position parallel to the longitudinal axis of wheel boom 22, and L-shaped arm portion 38 is moved into a position orthogonal to wheel boom 22. As a result, a U-shaped bracket or frame, having an open outer end, is created around the base of tire 18. The distance between wheel boom 22 and each L-shaped arm portion 45 is substantially less than the diameter of the smallest automobile tire but is greater than a predetermined minimum width, such that each U-shaped frame will engage and support a major portion of tire 18; the portion engaged is sufficiently large that a vehicle can be satisfactorily lifted and towed by virtue of the engagement.

Once each tire is framed by members 45, 38, and 22, derrick 13 raises main boom 14, and car 16 is then towed away. The system needs only one operator to align main boom 14; the alignment need not be exact and can be accomplished by aligning main boom 14 with the center of the car visually through the rear view mirror of the tow truck.

Figure 2:
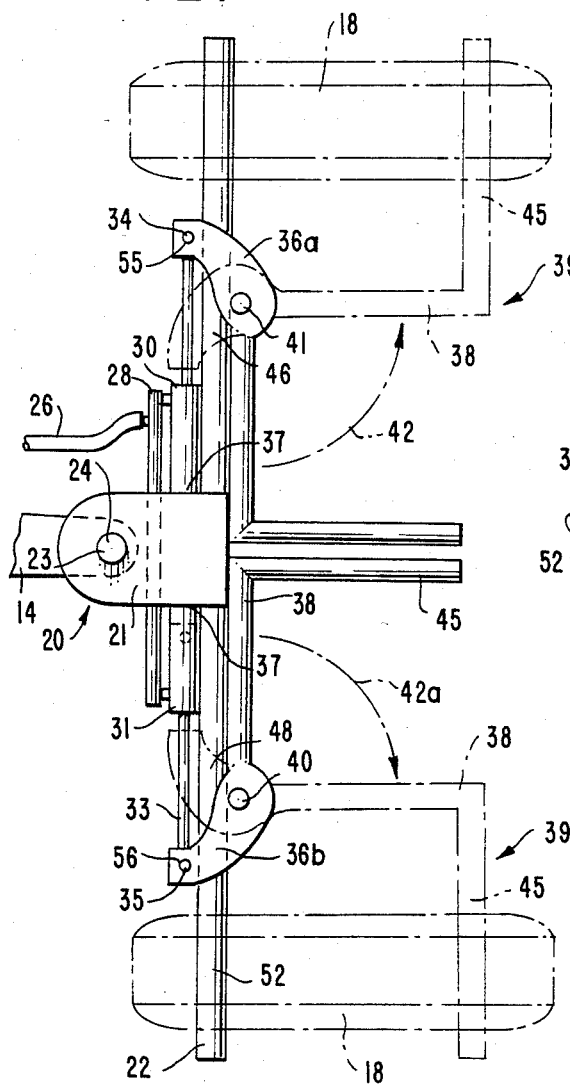
FIG. 2 is a top view of the wheel boom arrangement illustrating the tire lifts in their operative position (in dashed lines) and in their inoperative position (in solid lines)
Figure 3:
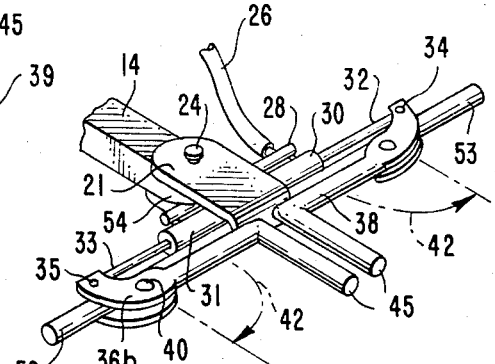
FIG. 3 is a detailed perspective view of the wheel boom arrangement in its closed, inoperative position.

Referring to FIGS. 2 and 3, the details of the wheel boom arrangement are shown with more specificity. Wheel boom 22 is pivotally connected, in substantially transverse alignment to main boom 14 by means of connector 20. The connector comprises a flange 21 having an arcuate end and a planar end which is attached to the midpoint of wheel boom 22. Although not illustrated, the method of attaching the planar end to the wheel boom is preferably by welding, as an extremely strong joint is desired. Additionally, flange 21 is made of a durable iron or steel construction, preferably ½-inch steel plate. Flange aperture 23 is located on flange 21 and is aligned with a similarly sized aperture 54 in main boom 14. Steel pin 24 is inserted through flange aperture 23 and into main boom 14 so as to complete the pivotal connection between wheel boom 22 and main boom 14. As flange aperture 23 is located adjacent to the arcuate end of flange 21, wheel boom 22 can pivot almost 90° along a horizontal plane in a direction away from line or hose 26 as indicated by arrow 42a in FIG. 3. Because of the presence of line 26, pivoting movement towards the line is limited to approximately 55°. This pivotable connection enables a tow truck operator to approach vehicles at relatively sharp angles; additionally, the ability to rotate main boom 14 with respect to the vehicle also enhances such movement.

Wheel boom 22 is made of a durable metal, such as iron or steel, and is formed into a square circular or rectangular bar having a length that is equal to, or slightly wider than, that of the widest cars on the market. Located between wheel boom 22 and main boom 14 is pipe 28, fittings and hose which is attached on one side to hose 26 and at its opposite ends of its other side to hydraulic cylinders 30 and 31. Hose 26 can be made of a heavy-duty rubber or plastic and is secured along a major portion of its length to main boom 14 (not shown). The opposite end of hose 26 is attached to a supply (not shown), which provides pressurization of the cylinders at suitable levels for maintaining the L-shaped arms in rest and in operative positions; when the arms are in their latter position they serve to lift extremely heavy objects. The supply source can be hydraulic, pneumatic, electric, or can take any other appropriate form; the present application will describe a hydraulic system for operating the cylinders. Further, to simplify operation of cylinders 30 and 31, control for the supply source can be provided from within the vehicle.

Hydraulic cylinders 30 and 31 are attached to wheel boom 22 along one side and are attached at their respective bases 37 to the sides of flange 21 that are generally orthogonal to the longitudinal axis of wheel boom 22. Cylinders 30 and 31 include arm portions 32 and 33, respectively, which are extendible away from and toward each cylinder when the cylinders are pressurized. The ends of arms 32 and 33 are attached to respective L-shaped wheel lift arm or members 39. The attachment occurs via arcuately shaped base portions 36a and 36b, respectively, through first apertures 55 and 56. The form of attachment is similar to that of the connection between the main boom and the wheel boom. Apertures 55 and 56 are located adjacent the end of base portions 36a and 36b, and correspond with apertures located at the end of cylinder arms 32 and 33 (not shown). Pins 34 and 35 are inserted through apertures 55 and 56 and into respective cylinder arms so to pivotally and securely attach the cylinder arms to L-shaped lifting bars 39. The opposite ends of lift bar base portions 36a and 36b have second apertures 40 and 41, which communicate with respective apertures (not shown) in wheel boom 22. Steel pins (unreferenced) are inserted through a second aperture 40 and 41 and into respective apertures in wheel boom 22, thus creating a pivotable connection about points 55 and 56.

In operation, L-shaped arms 39 are in a closed, inoperative position when cylinder arms 32 and 33 are fully extended. In this position, bases 36a and 36b of L-shaped arms 39 are generally parallel to, and abut, wheel boom 22; and L-shaped arm portions 45 are orthogonal to the longitudinal axis of wheel boom 22 and are mutually parallel thereto. In this closed position, end portions 52 and 53 of wheel boom 22 abut against respective tread portions of tires 18. Once firmly in contact with the tire, the operator can energize the fluid pressurization source for the cylinders, such that fluid communicates via line 26 and through lines 28 with cylinders 30 and 31. To open L-shaped arms 39, pressurization is required to fully retract cylinder arms 32 and 33. As a result, arcuately shaped base portions 36a and 36b pivot about points 40 and 41 and towards cylinders 30 and 31 until the base portions are in the position indicated by dotted lines 46 and 48 (FIG. 2). Arm portions 38, in turn, swing away from wheel boom 22 in the directions indicated by arrows 42 until they are substantially orthogonal to the longitudinal axis of wheel boom 22. Outer L-shaped arm portions 45, in this operative lifting position of the device, are then located parallel to wheel boom ends 52 and 53. A U-shaped framework is thus formed. Main boom 14 is then lifted, which raises tires 18 and, in turn, vehicle 16, to a desired height. Because of the U-shaped frame configuration located essentially at the vehicle center and because the structure includes no outwardly extending portions, vehicles parked along curbsides can be successfully lifted without inteference from the curb. This is not the case with prior art devices.

Once the towed vehicle reaches an unloading destination, main boom 14 is lowered until frame portions 38, 45 and 52, and frame portions 38, 45 and 53, respectively, no longer contact the underside of tires 18. Cylinders 30 and 31 are then pressurized, causing extension of arms 32 and 33. As a result, L-shaped arms 39 pivot over 90° toward wheel boom 22 and assume the inoperative position shown in FIG. 3. The tow truck 12 can then be driven forward until main boom 14 clears vehicle 16. Main boom 14 can then be raised by derrick 13 until wheel boom 22 is positioned well above the road.

Although the present invention has been described with respect to specific features, embodiments, and advantages, it is clear that a variety of such embodiments, features, and advantages can be contemplated within the scope of the present invention.

What is claimed is:

1. A device adapted to be attached to a towing vehicle and adapted to raise the wheels of a vehicle to be towed, said device comprising:
   (a) at least one main boom adapted to be mounted on said towing vehicle;
   (b) a wheel boom connected to said main boom in a position substantially transverse to said main boom;
   (c) a pair of lift-arms, each of said arms being substantially L-shaped and each being pivotally attached to said wheel boom;
   (d) means for pivoting said lift-arms between a rest position in which said lift-arms are adjacent to said wheel boom and an operative position in which each lift arm forms a substantially U-shaped frame with a portion of said wheel boom, said U-shaped frame comprising means for engaging and supporting the underside of a respective vehicle tire, said lift-arm pivoting means comprising a pair of hydraulically operated cylinders, each of said hydraulic cylinders including a cylinder portion and an arm portion which is adapted to reciprocate along a linear path parallel to the longitudinal axis of said wheel boom linear motion of respective hydraulic cylinders causing each of said generally L-shaped arms to pivot and to form, together with a portion of said wheel boom, a generally U-shaped, outwardly directed wheel bowl, each wheel bowl comprising means for receiving a vehicle wheel.

2. The apparatus of claim 1 wherein said lift-arms are attached to said wheel boom on opposite sides of the connection between said wheel boom and said main boom.

3. The apparatus of claim 2 further comprising means for moving said main boom in both horizontal and vertical planes.

4. The apparatus of claim 3 wherein said wheel boom is pivotally connected to said main boom and is pivotable over at least 55° in either direction, taken along a horizontal plane.

5. The apparatus of claim 4 wherein said wheel boom and said main boom are connected by a flange having one arcuate end attached to a central point of said wheel boom, said flange having a flange aperture located adjacent to an opposite end of said flange.

6. The apparatus of claim 5 wherein said flange aperture is aligned with an aperture in said main boom, a first pin adapted to be inserted through said flange aperture and into said main boom aperture, thereby pivotally connecting said wheel boom to said main boom.

7. The apparatus of claim 6 wherein each of said lift arms comprises an integral, arcuately shaped base portion and an arm portion having upper and lower segments.

8. The apparatus of claim 7 wherein each base portion has a first aperture and a second aperture, said second aperture being located adjacent to said lower segment of said L-shaped arm.

9. The apparatus of claim 8 wherein each of said second apertures is aligned with a respective wheel boom aperture, a second pin adapted to be inserted through said second aperture and into said wheel boom aperture, said lift arms thus being adapted to pivot about said second aperture.

10. The apparatus of claim 9 wherein the linear paths of said cylinders are directed oppositely from each other.

11. The apparatus of claim 10 wherein said hydraulic cylinders are attached to said wheel boom on opposite sides of the connection between said booms, each cylinder being oriented parallel to the longitudinal axis of said wheel boom.

12. The apparatus of claim 11 wherein said hydraulic cylinder arm portions move in a direction parallel to said wheel boom, inward movement of said arm portions pivoting said lift-arms away from said wheel boom such that said lower segments of said L-shaped arms are spaced from said wheel boom in a position substantially transverse thereto.

13. The apparatus of claim 1 wherein each of said U-shaped frames comprises an end portion of said wheel boom, an upper segment of said L-shaped arm, and a lower segment of said L-shaped arm.

14. The apparatus of claim 13, wherein said end portion and said upper segment are parallel and spaced apart by a distance less than the diameter of the vehicle tire to be lifted.

15. The apparatus of claim 14 in combination with a towing vehicle, said main boom attached to a rear portion of said towing vehicle.

16. A method for towing an automobile by using a device adapted to be attached to a tow vehicle and adapted to raise the wheels of a vehicle to be towed, the device including at least one main boom, a wheel boom connected to said main boom, and a pair of generally L-shaped lift-arms pivotally attached to said wheel boom, each of the lift-arms comprising a pair of hydraulically operated cylinders, each hydraulic cylinder including a cylinder portion which is adapted to reciprocate along a linear path parallel to the longitudinal axis of the wheel boom, said method comprising:
(a) lowering the main boom which is attached to said tow vehicle;
(b) backing up said tow vehicle until said main boom is located substantially at the midpoint between tires on said automobile, so that said wheel boom, which is transversely attached to said main boom, abuts the tread portion of said tires;
(c) hydraulically actuating said pair of cylinders attached to said wheel boom so as to reciprocate along a linear path parallel to said longitudinal axis of said wheel boom such that said pair of L-shaped arms attached to said cylinders pivot away from said wheel boom to form an open-ended, U-shaped frame, together with said wheel boom, to frame the underside of each of said automobile tires;
(d) lifting said main boom to raise said automobile tires off of the ground; and
(e) moving said automobile.

17. A device adapted to be attached to a towing vehicle and adapted to raise the wheels of a vehicle to be towed, said device comprising:
(a) at least one main boom adapted to be mounted on said towing vehicle;
(b) a wheel boom connected to said main boom in a position substantially transverse to said main boom, and means for moving said main boom in both horizontal and vertical planes, said wheel boom being pivotally connected to said main boom and being pivotal over at least 55° angle in either direction, as viewed along a horizontal plane, said wheel boom and said main boom being connected by a flange having one arcuate end attached to a central point of said wheel boom, said flange having a flange aperture located adjacent to an end of said flange opposite from said arcuate end, said flange aperture being aligned with an aperture in said main boom, a first pin being adapted to be inserted through said flange aperture and into said main boom aperture thereby pivotally connecting said wheel boom to said main boom;
(c) a pair of tire lift-arms, each of said arms being substantially L-shaped and each being pivotally attached to said wheel boom, on opposite sides of the connection between said wheel boom and said main boom, each of said lift-arms comprising an integral, arcuately shaped base portion and an arm portion having upper and lower segments, each base portion having first and second apertures, said second aperture of said base portion being located adjacent to said lower segment of said L-shaped arm; and
(d) means for pivoting said lift-arms between a rest position in which said lift-arms are adjacent to said wheel boom and an operative position in which each lift-arm forms a substantially U-shaped frame with a portion of said wheel boom, said U-shaped frame comprising means for engaging and supporting the underside of a respective vehicle tire.

* * * * *